(12) United States Patent
Kain

(10) Patent No.: US 6,698,838 B2
(45) Date of Patent: Mar. 2, 2004

(54) JUVENILE SEAT WITH MOVABLE ARMREST

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/961,739

(22) Filed: Sep. 24, 2001

(65) Prior Publication Data

US 2003/0057759 A1 Mar. 27, 2003

(51) Int. Cl.[7] .................................................. A47C 7/54
(52) U.S. Cl. ............................ 297/411.32; 297/250.1
(58) Field of Search .................... 297/250.1, 411.32, 297/411.38

(56) References Cited

U.S. PATENT DOCUMENTS

| | | | |
|---|---|---|---|
| 2,602,488 A | | 7/1952 | Conning |
| 3,116,093 A | * | 12/1963 | Bosack .................. 297/411.32 |
| 3,397,912 A | * | 8/1968 | Bush ...................... 297/354.12 |
| 3,544,163 A | * | 12/1970 | Krein ..................... 297/411.32 |
| 3,909,063 A | * | 9/1975 | Bonisch et al. ............. 297/113 |
| 3,992,057 A | | 11/1976 | Studebaker |
| 4,040,665 A | * | 8/1977 | Wallace et al. ........ 297/411.32 |
| 4,067,613 A | | 1/1978 | Pesiri |
| 4,099,780 A | | 7/1978 | Schmidhuber |
| 4,310,196 A | * | 1/1982 | Vogel ..................... 297/411.32 |
| 4,466,664 A | * | 8/1984 | Kondou ................. 297/411.39 |
| 4,660,237 A | | 4/1987 | Brodnax |
| 4,768,797 A | | 9/1988 | Friedrich |
| 4,874,203 A | | 10/1989 | Henley |
| 5,056,868 A | | 10/1991 | Beck |
| 5,088,791 A | | 2/1992 | Conley et al. |
| 5,316,373 A | | 5/1994 | Markel |
| 5,342,115 A | * | 8/1994 | De Filippo ............. 297/411.32 |
| 5,366,271 A | | 11/1994 | Johnston et al. |
| 5,366,276 A | | 11/1994 | Hobson et al. |
| 5,609,389 A | | 3/1997 | Longoria et al. |
| 5,669,663 A | | 9/1997 | Feuerherdt |
| 5,678,896 A | * | 10/1997 | Chung ................... 297/411.38 |
| 5,810,445 A | | 9/1998 | Surot |
| 6,203,101 B1 | * | 3/2001 | Chou et al. ................. 297/115 |
| 6,217,119 B1 | * | 4/2001 | Cook et al. ............ 297/411.32 |

FOREIGN PATENT DOCUMENTS

| | | | |
|---|---|---|---|
| DE | 4441011 C1 | * | 7/1996 |
| GB | 2342288 A | * | 4/2000 |

* cited by examiner

*Primary Examiner*—Peter M. Cuomo
*Assistant Examiner*—Joseph Edell
(74) *Attorney, Agent, or Firm*—Barnes & Thornburg (57) ABSTRACT

A seat assembly includes a seat and armrests that are movable relative to the seat. An armrest lock supports each armrest for movement relative to the seat between a raised storage position and a lowered armrest position. Each armrest lock is movable relative to the seat between an armrest-locking position and an armrest-releasing position. Each armrest lock is able to move to its armrest-locking position once its companion armrest has been moved to assume either the raised storage position or the lowered armrest position.

42 Claims, 6 Drawing Sheets

JUVENILE SEAT WITH MOVABLE ARMREST

This disclosure relates to a seat provided with an armrest, and particularly to an armrest included in a juvenile seat for use in a vehicle. More particularly, this disclosure relates to an armrest that is movable relative to a seat back in a juvenile seat.

Juvenile seats are used to seat and restrain children seated in vehicles. Many juvenile seats include seat bottoms and backs and armrests. Such seats are adapted to use vehicle safety belts or other harnesses to restrain children seated on these seats.

According to this disclosure, a seat assembly includes a seat and an armrest lock mounted on the seat for movement between an armrest-locking position and an armrest-releasing position. The assembly further includes an armrest that rotates on the armrest lock about a pivot axis from a raised storage position to a lowered armrest position.

In illustrative embodiments, the armrest lock is configured to lock the armrest to the seat upon rotation of the armrest to either the raised storage position or the lowered armrest position and movement of the armrest lock along the pivot axis to the armrest-locking position. Once the armrest lock is moved along the pivot axis to the armrest-releasing position, the armrest is free to rotate about the pivot axis relative to the seat to either the raised storage position in a notch formed in a side wall of the seat back or the lowered armrest position in a horizontal orientation above and alongside a seat bottom included in the seat.

A drive spring is coupled to the armrest lock and biased normally to urge the armrest lock to assume the armrest-locking position. A lock actuator is mounted on a lock housing containing the armrest lock and movable to urge the armrest lock against the drive spring to assume the armrest-releasing position so that the armrest can rotate about the pivot axis on the armrest lock between the raised storage position and the lowered armrest position.

A return spring is coupled at one end to the armrest and at an opposite end to the lock housing. The return spring is biased normally to urge the armrest to assume the lowered armrest position.

Additional features of the present disclosure will become apparent to those of ordinary skill in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 3:
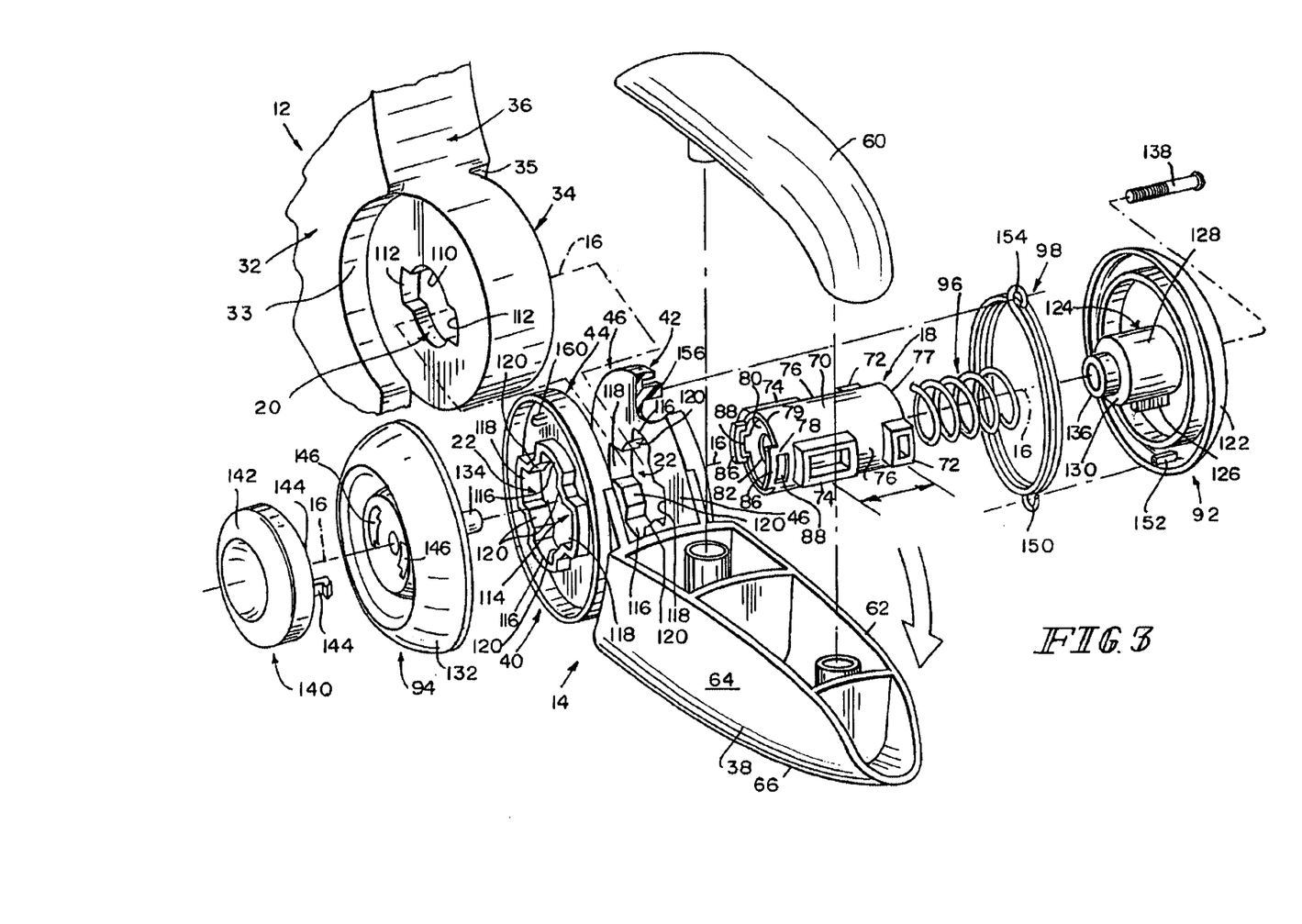
FIG. 3 is an exploded perspective view of a support mount on the seat back, an armrest including an arm and a pair of spaced-apart arm support plates coupled to the arm and arranged to receive the support mount therebetween, and components which cooperate to support the armrest for pivotable movement on the support mount and to provide a push-button-actuated locking mechanism associated with that armrest, the components including (from left to right) a "button-style" lock actuator, a left hub, a tubular armrest lock, a drive spring, a return spring, a right hub, and a hub connector.

A juvenile seat assembly 10 includes a seat 12 and a pair of movable armrests 14 mounted on seat 12 for pivotable movement about pivot axes 16. An armrest lock 18 shown, for example, in FIG. 3 is provided for each armrest 14 and is configured to extend through passageways 20, 22 (also shown in FIG. 3) formed in seat 12 and armrest 14. Each armrest 14 is supported on its companion armrest lock 18 for pivotable movement about its pivot axis 16 as shown, for example, in FIGS. 5–10.

Each armrest lock 18 is constrained to move back and forth along armrest pivot axis 16 between (1) an armrest-locking position (shown in FIGS. 5 and 6) to engage seat 12 and its companion armrest 14 to block movement of that armrest 14 relative to seat 12 and (2) an armrest-releasing position (shown in FIGS. 7, 8, and 9, 10) to disengage that armrest 14 to allow movement of that armrest 14 relative to seat 12 about armrest pivot axis 16. As described below, passageways 20, 22 formed in seat 12 and armrests 14 are configured so that each armrest lock 18 is able to move along armrest pivot axis 16 to assume its armrest-locking position only when the companion armrest 14 has been pivoted about pivot axis 16 to assume either the lowered armrest position shown in FIG. 1 or the raised storage position shown in FIG. 2.

Figures 1, 2:
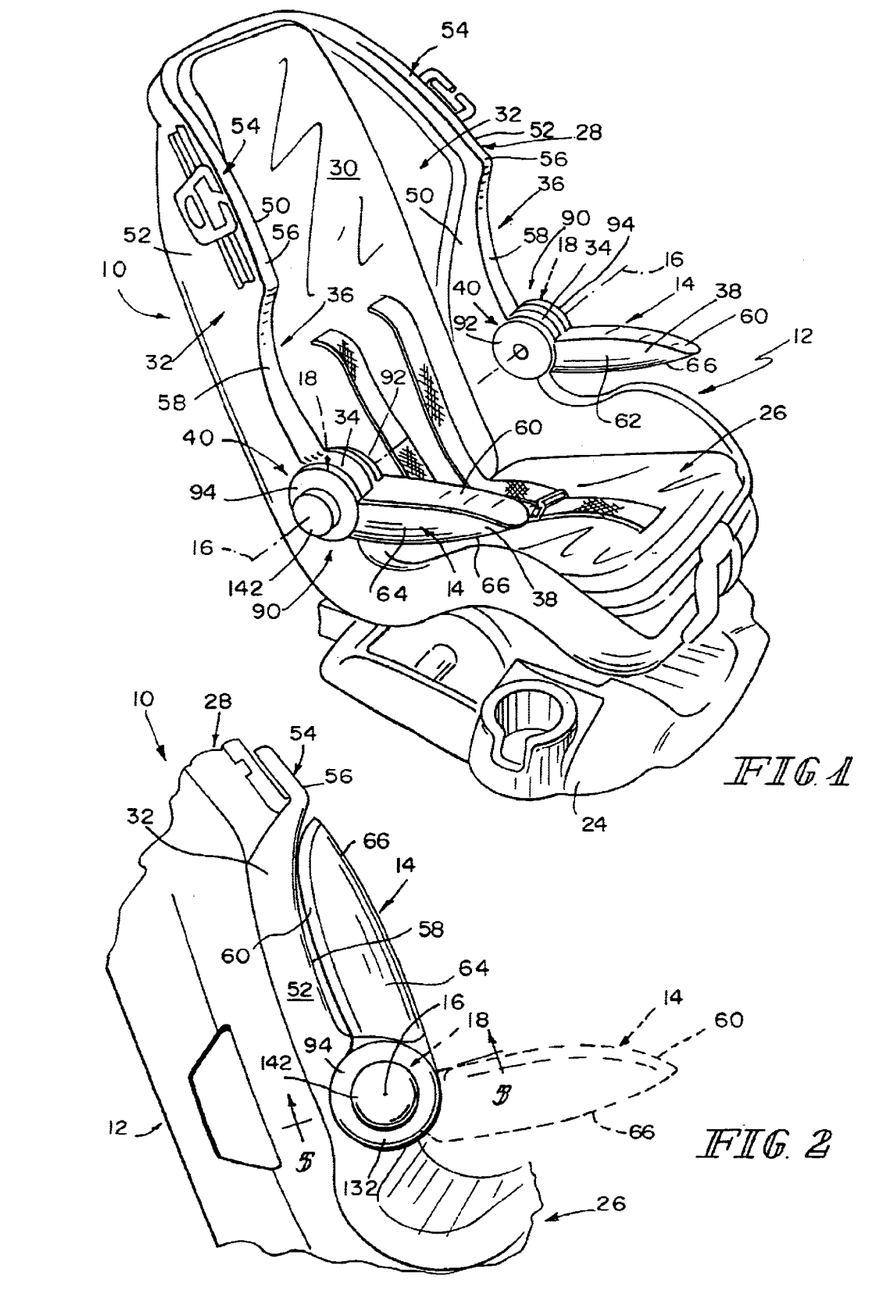
FIG. 1 is a perspective view of a juvenile seat including a seat bottom supported on a base, a seat back arranged to extend upwardly from the seat bottom, and a pair of movable armrests and showing that each armrest is mounted on a support mount provided on a perimeter edge of the seat back to pivot up and down about a pivot axis extending horizontally through the support mount.
FIG. 2 is an enlarged side elevation view of a portion of the juvenile seat of FIG. 1 showing one of the armrests after it has been moved upwardly from its lowered armrest position (shown in phantom) to assume its raised storage position (shown in solid) nested within a notch formed in a side wall of the seat back to lie above the support mount.

Seat 12 includes a base 24 adapted to set on a vehicle seat (not shown), a seat bottom 26 supported on base 24, and a seat back 28 arranged to extend upwardly from seat bottom 26 as shown, for example, in FIG. 1. Seat back 28 includes a seat back portion 30 and a side wall 32 appended to each side of seat back portion 30 as shown, for example, in FIG. 1. Seat back 28 further includes a support mount 34 for each armrest 14.

Each side wall 32 in seat back 28 is formed to include an armrest-receiving notch 36 and a companion support mount 34 below each notch 36. An arm 38 included in each armrest 14 is sized and shaped to fit into a companion notch 36 when that armrest 14 is pivoted about pivot axis 16 to assume its raised storage position as shown, for example, in FIG. 2.

Each armrest 14 also includes an arm support 40 coupled to an inner end of arm 38 and configured to mate with support mount 34 as shown, for example, in FIGS. 1–5. In an illustrative embodiment, arm support 40 includes an inner arm support plate 42 formed to include a portion of passageway 22 and an outer arm support plate 44 formed to include another portion of passageway 22. Support mount 34 is sized to fit into a space 46 provided between inner and outer arm support plates 42, 44 when armrest 14 is mounted on seat back 28. Side wall 32 is also formed to include an outer concave curved surface 33 located on one side of support mount 34 to receive the rotatable outer arm support plate 44 therein a suggested, for example, in FIG. 3. Side wall 32 also includes an inner concave curved surface 35 located on an opposite side of support mount 34 to receive the rotatable inner arm support plate 42 therein as suggested, for example, in FIG. 3.

Referring to FIGS. 1–3, it will be seen that each side wall 32 of seat back 28 includes an inner panel 50 located adjacent to seat back portion 30, an outer panel 52 located in spaced-apart relation to inner panel 50, and a front panel 54 interposed between inner and outer panels 50, 52. Front panel 54 includes an upper portion 56 located above arm-receiving notch 36 and a lower portion 58 configured to define notch 36. Lower portion 58 is arranged to lie adjacent to arm 38 upon movement of armrest 14 to its raised storage position as shown, for example, in FIG. 2.

Continuing to refer to FIGS. 1–3, it will be seen that arm 38 includes top panel 60 adapted to support an arm of an occupant (not shown) seated in seat 10 upon movement of armrest 14 to the lowered armrest position. Arm 38 also includes inner panel 62, outer panel 64, and bottom panel 66. Lower portion 58 of front panel 54 of side wall 32 of seat 10 has a concave curved shape and top panel 60 of arm 38 has a convex curved shape made to "mate" with the concave curved shape of lower portion 58 upon movement of armrest 14 to the raised storage position as shown, for example, in FIG. 2. Arm 38 is sized and arranged to "fill" notch 36 upon movement of armrest 14 to the raised storage position to cause top panel 60 of arm 38 to face toward lower portion 58 of front panel 54 of side wall 32 and to cause bottom panel 66 of arm 38 to "merge" with upper portion 56 of front panel 54 as also shown, for example, in FIG. 2 so that bottom panel 66 of arm 38 appears to an observer to be a continuation of upper portion 56 of front panel 54 of side wall 32.

A mechanism is provided for locking armrest 14 to support mount 34 of seat back 28 whenever armrest 14 is moved to its lowered armrest position shown in FIG. 1 or its raised storage position shown in FIG. 2. An actuator is provided for unlocking armrest 14 at the option of a user whenever the user desires to move armrest 14 from its lowered armrest position to its raised storage position and vice versa.

Figure 4:
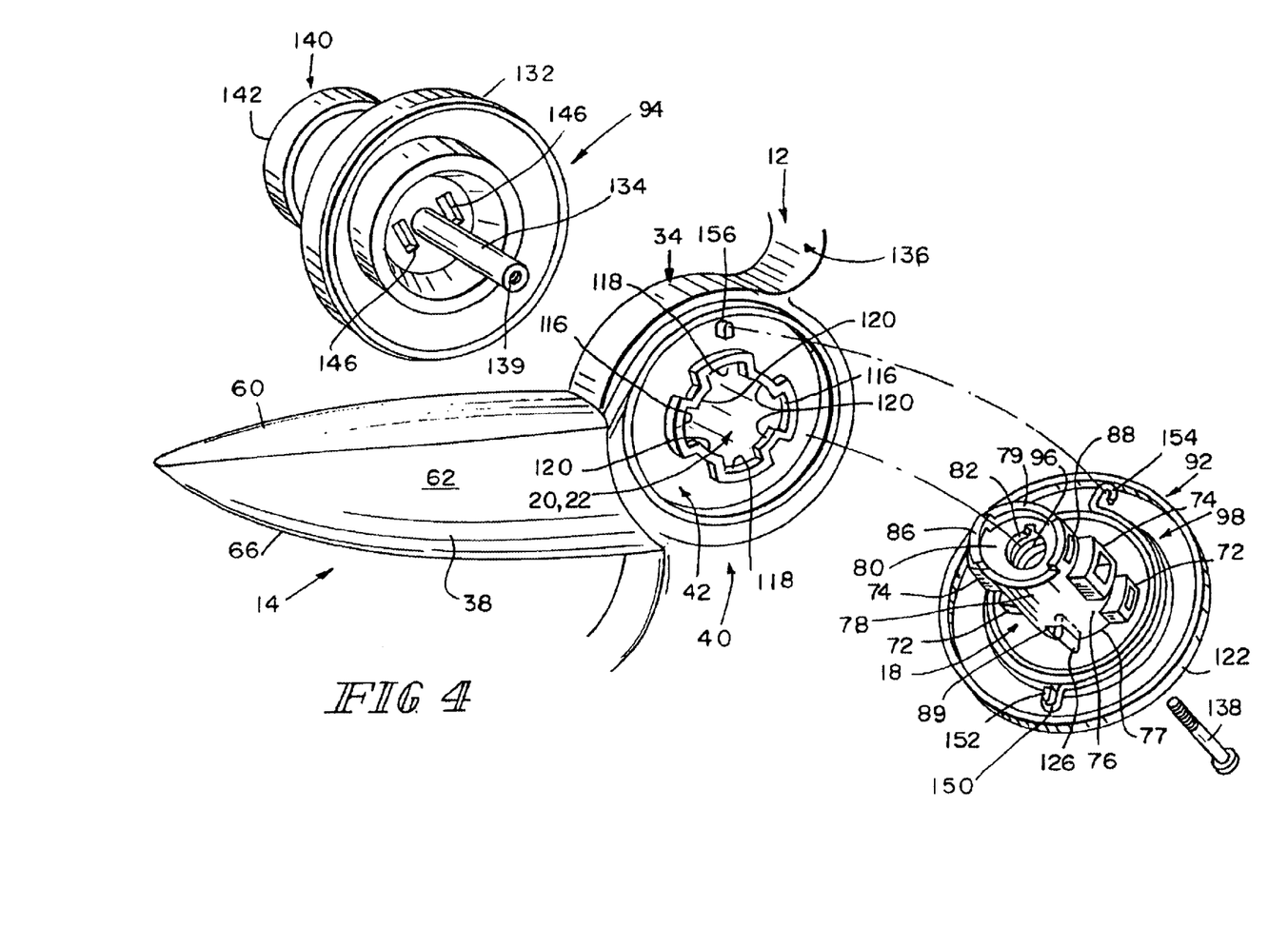
FIG. 4 is a perspective view showing the armrest mounted on the support mount provided on the seat back to align passageways formed in the arm support plates of the armrest with passageways formed in the support mount so that a lock housing comprising the left and right hubs and containing the tubular armrest lock, the drive spring, and return spring can be assembled (as shown, for example, in FIGS. 1 and 5) to trap the support mount and portions of the armrest between the left and right hubs and to position the tubular armrest lock in the aligned passageways formed in the armrest and support mount for sliding movement along the armrest pivot axis (as shown, for example, in FIGS. 5, 7, and 9)

In an illustrative embodiment shown in FIGS. 3 and 4, armrest lock 18 includes a barrel 70, inner lugs 72 provided on one end of barrel 70, and outer lugs 74 provided near an opposite end of barrel 70. An annular inner bearing 76 is provided on an exterior surface of barrel 70 and arranged to extend through spaces provided between companion pairs of inner and outer lugs 72, 74. An annular outer bearing 78 is provided on an exterior surface of barrel 70 and arranged to extend through spaces provided between an outer end 79 of barrel 70 and outer lugs 74. Barrel 70 is formed to include an interior partition 80 formed to include a connector passage hole 82 and a chamber 84 lying between interior partition 80 and an inner end 77 of barrel 70. Chamber 84 is sized to receive a drive spring 96 and a guide post 124 shown, for example, in FIG. 3 and described in more detail below.

Axially extending curved flanges 86 are appended to outer end 79 of barrel 70 and arranged to lie in circumferentially spaced-apart relation to one another. A pair of finger-receiving apertures 88 is formed in barrel 70 so that each aperture 88 lies in a space between an outer lug 74 and its companion flange 86 and interrupts the portion of the exterior surface of barrel 70 defining annular outer bearing 78. An axially extending guide slot 89 is formed in barrel 70 to have an opening in inner end 77 and is sized to receive an anti-rotation lug 126 shown, for example, in FIG. 3 and described below.

A lock housing 90 comprising inner hub 92 and outer hub 94 is configured to provide an interior region 91 containing outer arm support plate 44, support mount 34, inner arm support plate 42, and armrest lock 18. A drive spring 96 and a return spring 98 are also contained in interior region of lock housing 90. Drive spring 96 is located and biased to urge armrest lock 18 along pivot axis 16 to assume its armrest-locking position whenever armrest 14 is moved to assume either one of the raised storage positions shown in FIG. 2 or the lowered armrest position shown in FIG. 1. Return spring 98 is located and biased to apply a torque about pivot axis 16 to urge armrest 14 to assume its lowered armrest position shown in FIG. 1 whenever armrest lock 18 is moved to an armrest-releasing position.

Passageway 20 formed in support mount 34 is defined to receive armrest lock 18 and allow armrest lock 18 to move back and forth along an axis (such as pivot axis 16) as it moves between armrest-locking and armrest-releasing positions. Support mount 34 is formed to include a barrel channel 110 and a pair of lug slots 112 lying on "opposite sides" of barrel channel 110 and having openings into barrel channel 110 as shown, for example, in FIG. 3. Barrel channel 110 and lug slots 112 cooperate to define passageway 20 as barrel channel 110 is sized to receive and support barrel 70 of armrest lock 18 and each lug slot 112 is sized to receive and support inner and outer lugs 72, 74 on barrel 70 as armrest lock 18 moves back and forth along pivot axis 16. Rotation of armrest lock 18 about pivot axis 16 during axial movement of armrest lock 18 along pivot axis 16 is blocked because of the placement of lugs 72, 74 in lug slots 112.

In an illustrative embodiment, each lug slot 112 formed in support mount 34 is defined by a U-shaped wall comprising three serially arranged segments as shown, for example, in FIG. 3. A boundary of barrel channel 110 is defined by two opposing curved segments having concave surfaces arranged to face one another and positioned to lie in a space between the U-shaped walls defining the lug slots 112.

Figure 5:
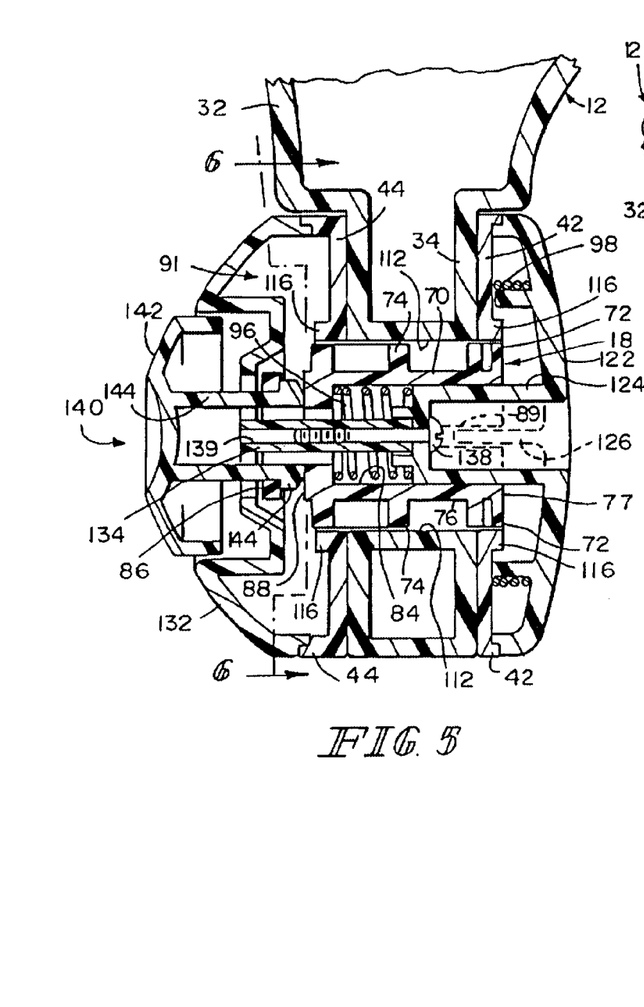
FIG. 5 is a sectional view taken along line 5—5 of FIG. 2 showing the tubular armrest lock in an armrest-locking position.
Figure 6:
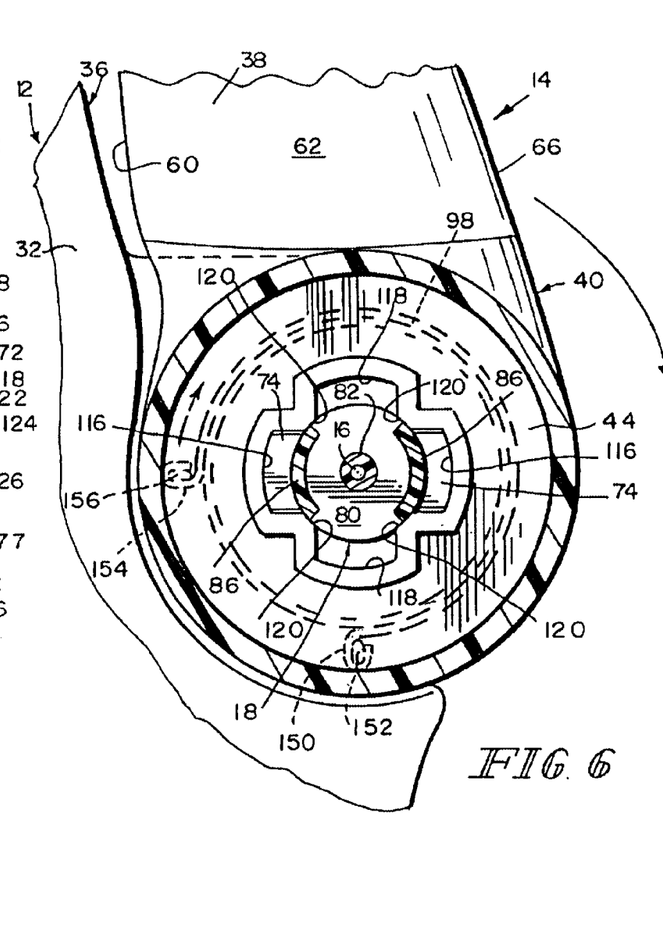
FIG. 6 is a sectional view taken along line 6—6 of FIG. 5 showing the armrest locked in its raised storage position nested in the notch formed in the side wall of the seat back and showing "loading" of a return spring (shown in phantom) located between the armrest and the right hub (as shown, for example, in FIGS. 4 and 5) and biased to urge the armrest to pivot in a clockwise direction to assume its lowered armrest position.
Figure 7:
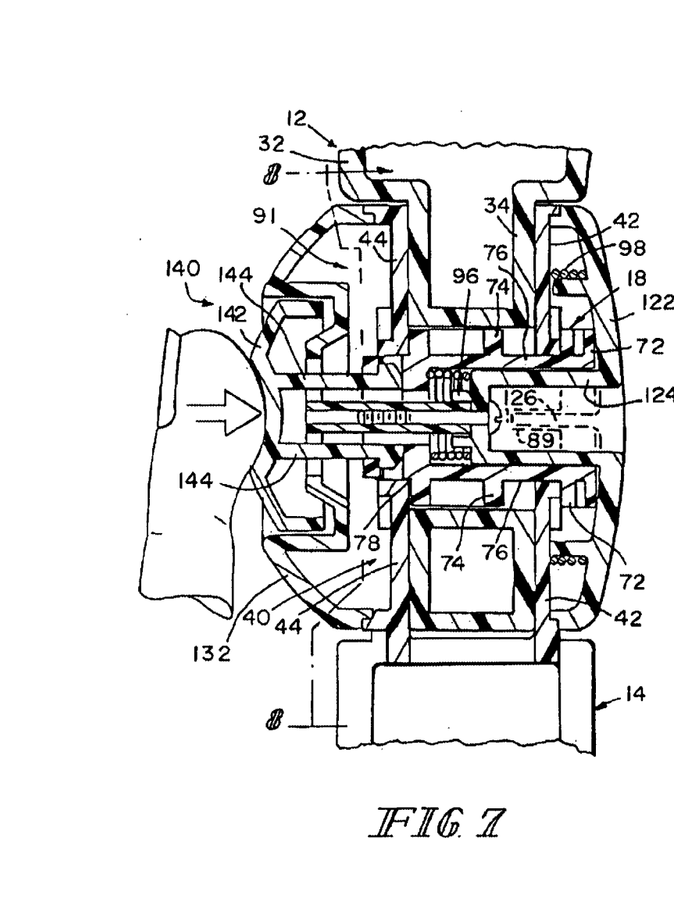
FIG. 7 is a sectional view similar to FIG. 5 showing manual movement of a push button included in the lock actuator to move the tubular armrest lock to the right along the armrest pivot axis against a drive spring acting between the tubular armrest lock and the right hub to an armrest-releasing position so that the armrest may be pivoted about the pivot axis to assume either its raised storage position or its lowered armrest position.
Figure 8:
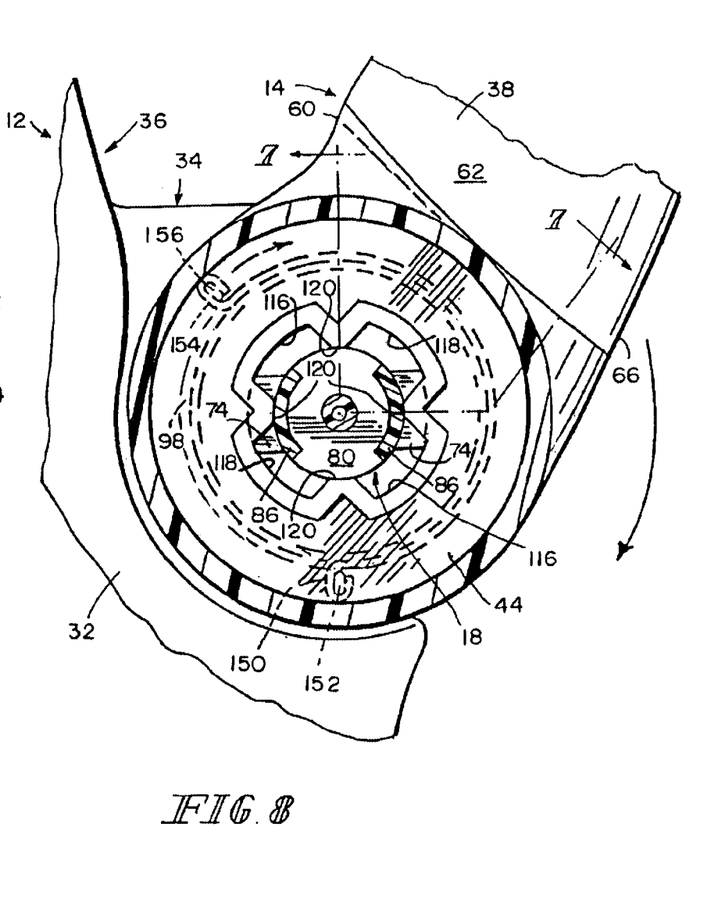
FIG. 8 is a sectional view taken along line 8—8 of FIG. 7 showing the armrest being pivoted about the pivot axis in a clockwise direction toward its lowered armrest position by a torque applied to the armrest about the pivot axis and generated by the "loaded" return spring (shown in phantom) as it "unwinds"
Figure 9:
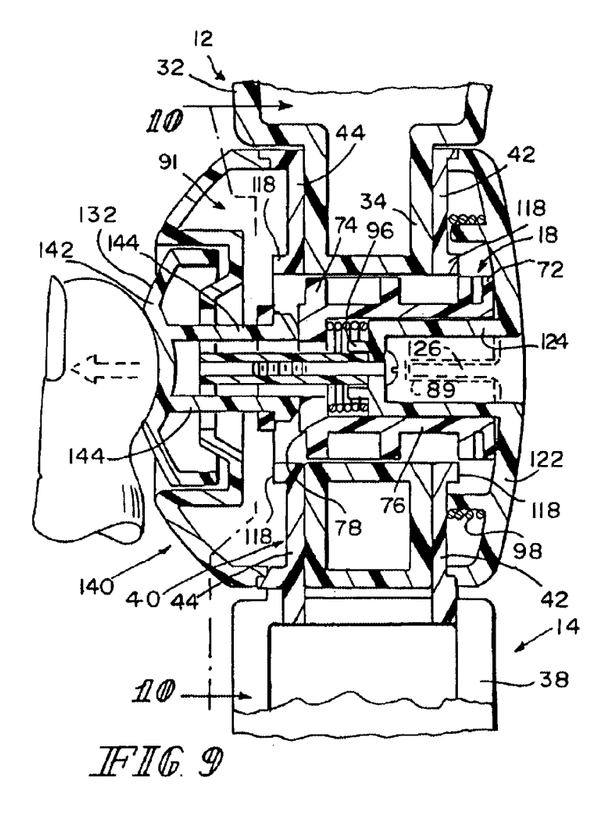
FIG. 9 is a sectional view similar to FIGS. 5 and 7 showing the armrest in its lowered armrest position before the push button is "released" to allow the drive spring acting between the tubular armrest lock and the right hub to move the tubular armrest lock to the left along the armrest pivot axis to an armrest-locking position (shown, for example, in FIG. 5)
Figure 10:
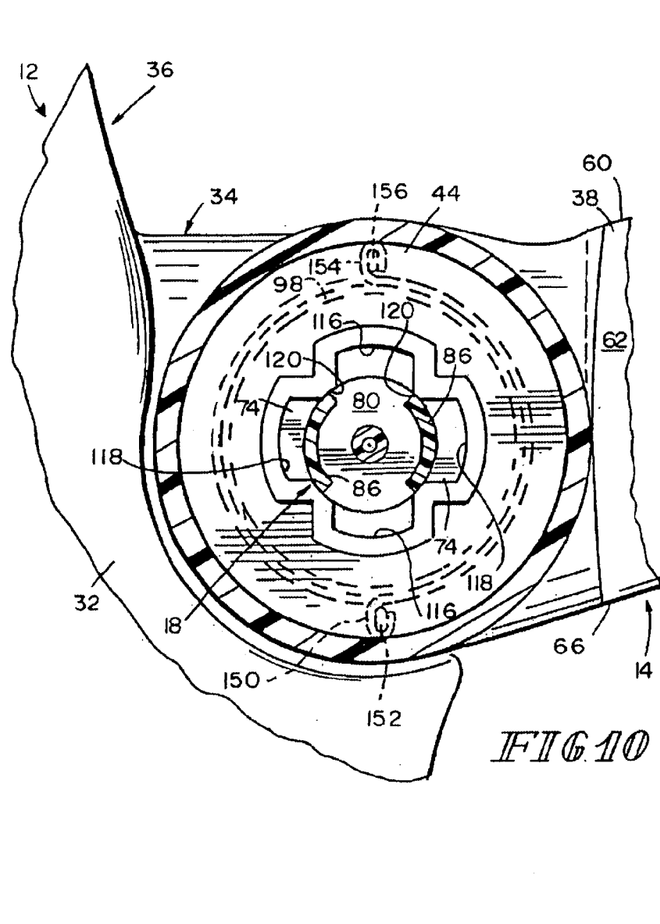
FIG. 10 is a sectional view taken along line 10—10 of FIG. 9 showing the armrest in its lowered armrest position.

Passageway 22 formed in each arm support plate 42, 44 is defined to receive armrest lock 18 when it is in the armrest-locking position as shown, for example, in FIGS. 5 and 6 and when it is in the armrest-releasing position as shown, for example, in FIGS. 7 and 8. Each arm support plate 42, 44 is formed to include a barrel receiver 114, two opposing first lug receivers 116 having openings into barrel receiver 114, and two opposing second lug receivers 118 having openings into barrel receiver 114. These receivers 114, 116, 118 cooperate to define passageway 22 as barrel receiver 114 is sized to receive and support barrel 70 of armrest lock 18 and each lug receiver 116, 118 is sized to receive and support either an inner lug 72 or an outer lug 74 provided on barrel 70. Each first lug receiver 116 is located to receive one of lugs 72 or 74 on barrel 70 when armrest 14 has been moved to its raised storage position as shown, for example, in FIGS. 2 and 6. Each second lug receiver 118 is located to receive one of lugs 72 or 74 on barrel 70 when armrest 14 has been moved to its lowered armrest position as shown, for example, in FIGS. 1 and 10.

In an illustrative embodiment, each lug receiver 116, 118 formed in an arm support plate 42, 44 is defined by a U-shaped wall comprising three serially arranged segments as shown, for example, in FIG. 3. A boundary of barrel receiver 114 is defined by an interior journal comprising four curved surfaces 120 (see FIGS. 3, 4, 6, 8, and 10) separated from one another and arranged to share a center of curvature positioned to lie along pivot axis 116. Each first lug receiver 116 is positioned to lie between an adjacent pair of the four curved surfaces 120 and each second lug receiver 118 is positioned to lie between another adjacent pair of the four curved surfaces 120 as shown, for example, in FIG. 3.

When armrest 14 is rotated about pivot axis 16 to move between its raised storage position and its lowered armrest position, armrest lock 18 will have been moved to its armrest-releasing position as shown, for example, in FIGS. 7 and 8 and the four curved surfaces 120 included in inner arm support plate 42 will lie in rotative bearing engagement with annular inner bearing 76 provided on the exterior surface of barrel 70 (near inner end 77) and the four curved surfaces 120 included in outer arm support plate 44 will lie in rotative bearing engagement with annular outer bearing 78 provided on the exterior surface of barrel 70 (near outer end 79). Each set of four curved surfaces 120 provide an "interior journal" in one of the arm support plates 42, 44 to support those arm support plates 42, 44 for rotation about pivot axis 16 during pivoting movement of armrest 14 between its raised and lowered positions. It is within the scope of this disclosure to use one or more other surfaces in each arm support plate 42, 44 to provide such an interior journal.

Inner hub 92 comprises a shell 122 and a guide post 124 appended to an interior surface of shell 122 as shown best in FIG. 3. Guide post 124 is sized to extend into the chamber 84 formed in barrel 70 of armrest 14. Guide post 124 is configured to support barrel 70 as barrel 70 slides in barrel channel 110 during movement of armrest lock 18 between the armrest-locking and armrest-releasing positions.

An anti-rotation lug 126 is appended to a cylindrical outer surface 128 of guide post 124 as shown, for example, in FIGS. 3 and 4. Anti-rotation lug 126 is movable in the axially extending guide slot 89 formed in barrel 70 (as suggested, for example, in FIGS. 5 and 7) to block rotation of inner hub 92 about pivot axis 16 without blocking sliding movement of barrel 70 along pivot axis 16 as armrest lock 18 moves between the armrest-locking and armrest-releasing positions.

Drive spring 96 is located in chamber 84 formed in barrel 70 of armrest lock 18. One end of drive spring 96 is positioned to engage interior partition 80 and an opposite end of drive spring 96 is positioned to engage an annular, axially outwardly facing surface 130 on an outer end of guide post 124. Drive spring 96 is biased yieldably to urge armrest lock 18 toward the armrest-locking position shown in FIGS. 5 and 6 so that armrest lock 18 will be moved to that armrest-locking position whenever the armrest 14 is moved to the raised storage position shown in FIG. 2 or the lowered armrest position shown in FIG. 1.

Outer hub 94 comprises a shell 132 and a mounting post 134 appended to an interior surface of shell 132 as shown, for example, in FIGS. 3–5. Mounting post 134 is sized to pass into a post-receiving aperture 136 formed in guide post 124 of inner hub 92. A connector 138 can be passed through aperture 136 to engage an aperture 139 formed in mounting post 134 so as to lock inner and outer hubs 92, 94 together as a unit to form lock housing 90.

A lock actuator 140 is coupled to armrest lock 18 and mounted for movement on lock housing 90 to move barrel 70 against a biasing force generated by drive spring 96 so as to move armrest lock 18 to assume the armrest-releasing position when armrest 14 occupies either the raised storage position or the lowered armrest position. Lock actuator 140 includes a button 142 located outside lock housing 90 and a pair of actuator fingers 144 coupled to button 142 as shown, for example, in FIGS. 3 and 5. Each actuator finger 144 is arranged to extend through one of apertures 146 formed in shell 132 and into one of the finger-receiving apertures 88 formed in barrel 70. Flanges 86 provided on outer end 79 of barrel 70 also extend into apertures 146 formed in shell 132.

Return spring 98 is positioned to lie in a space located between inner arm support plate 42 and inner hub 92 as suggested in FIGS. 3 and 4 and shown, for example, in FIGS. 5 and 6. In an illustrative embodiment, return spring 98 is a torsion spring having one end 150 coupled to a return spring mount 152 appended to an interior surface of inner hub shell 122 and another end 154 coupled to a return spring mount 156 appended to inner arm support plate 42. Rotation of armrest 14 about pivot axis 16 to assume the raised storage position as shown, for example, in FIG. 6, "loads" return spring 98 so that armrest 14 will rotate automatically about pivot axis 16 in clockwise direction 158 toward the lowered armrest position whenever armrest lock 18 is moved to its armrest-releasing position as shown, for example, in FIGS. 7 and 8. Another return spring mount 160 is appended to outer arm support plate 44 to be coupled to end 154 of return spring 98 if armrest 14 is used in the other armrest position on seat back 28. Return spring 98 is formed to include a central opening receiving guide post 124 therein as shown, for example, in FIG. 5.

Armrest lock 18 is moved along pivot axis 16 by drive spring 96 to block rotation of armrest 14 about pivot axis 16 whenever armrest 14 is moved to its lowered armrest position or its raised storage position. In the raised storage position shown, for example, in FIGS. 2, 5, and 6, the two first lug receivers 116 are arranged to lie in side-by-side relation to lug slots 112 formed in support mount 34, each of inner lugs 72 on barrel 70 extends into a lug slot 112 formed in support mount 34 and an adjacent first lug receiver 116 formed in inner arm support plate 42, and each of outer lugs 74 on barrel 70 extends into a lug slot 112 formed in support mount 34 and an adjacent first lug receiver 116 formed in outer arm support plate 44. In the lowered armrest position shown, for example, in FIGS. 1, 9, and 10, the two second lug receivers 118 are arranged to lie in side-by-side relation to lug slots 112 formed in support mount 34, each of inner lugs 72 on barrel 70 extends into a lug slot 112 formed in support mount 34 and an adjacent second lug receiver 118 formed in inner arm support plate 42, and each of outer lugs 74 on barrel 70 extends into a lug slot 112 formed in support mount 34 and an adjacent second lug receiver 118 formed in outer arm support plate 44. Lugs 72, 74 are located on barrel 70 to lie outside all of the first and second lug receivers 116, 118 formed in arm support plates 42, 44 as shown, for example, in FIG. 7 so that the interior journals (provided by curved surfaces 120) on arm support plates 42, 44 engage the bearings 76, 78 provided on barrel 70 of armrest lock 18 to support armrest 14 for pivotable movement about axis 16 between the raised storage position and the lowered armrest position.

Although the invention has been described in detail with reference to certain illustrative embodiments, variations and modifications exist within the scope and spirit of the invention as described and defined in the following claims.

What is claimed is:

1. A seat assembly comprising
  a seat,
  an armrest mounted for movement relative to the seat about a pivot axis between a raised storage position and a lowered armrest position,
  an armrest lock mounted for movement in a passageway formed in the seat between an armrest-locking position to engage the armrest and the seat and block movement of the armrest relative to the seat upon movement of the armrest about the pivot axis to one of the raised storage position and lowered armrest position and an armrest-releasing position to disengage the armrest to allow movement of the armrest relative to the seat about the pivot axis, and
  wherein the armrest is mounted for relative rotation and engagement on the armrest lock.

2. The seat assembly of claim 1, further comprising lock mover means for yieldably urging the armrest lock to assume the armrest-locking position upon movement of the armrest about the pivot axis to one of the raised storage position and lowered armrest position.

3. The seat assembly of claim 2, wherein the armrest lock is formed to include an interior wall defining a post-receiving chamber and a spring support located in the post-receiving chamber and the lock mover means includes a hub and a drive spring located in the post-receiving chamber to engage the spring support and the hub and biased yieldably to urge the armrest lock toward the armrest-locking position.

4. The seat assembly of claim 3, wherein the hub comprises a shell and a guide post coupled to the shell and arranged to extend into the post-receiving chamber and support the armrest lock as the armrest lock moves in the passageway formed in the seat between the armrest-locking position and the armrest-releasing position and the drive spring is engaged at one end to the spring support and at an opposite end to the guide post.

5. The seat assembly of claim 3, further comprising an anti-rotation lug coupled to the hub and arranged to move in an axially extending slot formed in the armrest lock to block rotation of the hub about the pivot axis as the armrest lock moves between the armrest-locking position and the armrest-releasing position and a return spring coupled at one end to the armrest and at an opposite end to the hub and biased yieldably to urge the armrest to assume the lowered armrest position.

6. A seat assembly comprising
  a seat
  an armrest mounted for movement relative to the seat about a pivot axis between a raised storage position and a lowered armrest position, and
  an armrest lock mounted for movement in a passageway formed in the seat between an armrest-locking position to engage the armrest and the seat and block movement of the armrest relative to the seat upon movement of the armrest about the pivot axis to one of the raised storage position and lowered armrest position and an armrest-releasing position to disengage the armrest to allow movement of the armrest relative to the seat about the pivot axis, wherein the seat is formed to include a barrel channel and a lug slot having an opening into the barrel channel and cooperating with the barrel channel to define the passageway receiving the armrest lock therein, the armrest is formed to include a barrel receiver, a first lug receiver having an opening into the barrel receiver and being arranged to lie in side-by-side relation to the lug slot upon movement of the armrest to the raised storage position, and a second lug receiver having an opening into the barrel receiver and being arranged to lie in side-by-side relation to the lug slot upon movement of the armrest to the lowered armrest position, and the armrest lock includes a barrel positioned for sliding movement in the barrel channel and barrel receiver between the armrest-locking and armrest-releasing positions and a lug coupled to the barrel, the lug is located to extend into both of the lug slot and the first lug receiver to block movement of the armrest relative to the seat upon movement of the armrest about the pivot axis to the raised storage position and movement of the barrel to the armrest-locking position, the lug is also located to extend into both of the lug slot and the second lug receiver to block movement of the armrest relative to the seat upon movement of the armrest about the pivot axis to the lowered armrest position and movement of the barrel to the armrest-locking position, and the lug is also located to extend into the lug slot and lie outside the first and second lug receivers to allow movement of the armrest about the pivot axis between the raised storage position and lowered armrest position upon movement of the barrel to the armrest-releasing position.

7. The seat assembly of claim 6, wherein the lug on the barrel extends into the lug slot formed in the seat during sliding movement of the barrel in the barrel channel between the armrest-locking position and the armrest-releasing position to block rotation of the barrel about the pivot axis during sliding movement of the barrel between the armrest-locking position and the armrest-releasing position and the barrel includes a bearing located adjacent to the lug and arranged to support an interior journal included in the armrest and arranged to form an outer boundary of the barrel receiver as the armrest is pivoted about the pivot axis and the barrel upon movement of the armrest lock to the armrest-releasing position.

8. The seat assembly of claim 7, wherein the interior journal includes four curved surfaces separated from one another and arranged to share a center of curvature positioned to lie along the pivot axis, the first lug receiver formed in the armrest is positioned to lie between a first adjacent pair of the four curved surfaces, and the second lug receiver is positioned to lie between a second adjacent pair of the four curved surfaces.

9. The seat assembly of claim 7, further comprising a lock housing formed to include an interior region containing the armrest lock therein and anti-rotation means coupled to the armrest lock for blocking rotation of the lock housing about the pivot axis without blocking sliding movement of the armrest lock between the armrest-locking and armrest-releasing positions and a lock actuator mounted for movement on the lock housing and wherein the lock actuator includes a button located outside the lock housing and an actuator finger coupled to the button and arranged to extend through an aperture formed in the lock housing and into an aperture formed in the barrel.

10. The seat assembly of claim 7, further comprising a lock housing formed to include an interior region containing the armrest lock therein and anti-rotation means coupled to the armrest lock for blocking rotation of the lock housing about the pivot axis without blocking sliding movement of the armrest lock between the armrest-locking and armrest-releasing positions and a return spring coupled at one end to the armrest and at an opposite end to the lock housing and biased yieldably to urge the armrest to assume the lowered armrest position.

11. The seat assembly of claim 6, further comprising lock mover means for yieldably urging the armrest lock to assume the armrest-locking position upon movement of the armrest about the pivot axis to one of the raised storage position and lowered armrest position.

12. The seat assembly of claim 11, further comprising a lock housing formed to include an interior region containing the armrest lock therein and a lock actuator coupled to the barrel and mounted for movement on the lock housing to move the barrel against a biasing force generated by the lock mover means so as to move the armrest lock to assume the armrest-releasing position when the armrest occupies one of the raised storage position and lowered armrest position.

13. The seat assembly of claim 11, wherein the lock mover means includes a hub configured to support the armrest lock as the armrest lock moves back and forth along the pivot axis between the armrest-locking position and the armrest-releasing position and a drive spring engaged at one end to the hub and at an opposite end to the armrest lock and biased yieldably to urge the armrest lock toward the armrest-locking position.

14. The seat assembly of claim 11, wherein the barrel is formed to include an interior wall defining a post-receiving chamber and a spring support located in the post-receiving chamber, the lock mover means includes a hub comprising a shell and a guide post coupled to the shell and arranged to extend into the post-receiving chamber and support the barrel as the barrel slides in the barrel channel during movement of the armrest lock between the armrest-locking position and the armrest-releasing position, and the lock mover further includes a drive spring located in the post-receiving chamber to engage the spring support in the barrel and the guide post in the hub and biased yieldably to urge the armrest lock toward the armrest-locking position.

15. The seat assembly of claim 14, wherein the hub further includes an anti-rotation lug movable in an axially extending slot formed in the barrel to block rotation of the hub about the pivot axis without blocking sliding movement of the barrel along the pivot axis as the armrest lock moves between the armrest-locking position and the armrest-releasing position and further comprising a return spring coupled at one end to the armrest and at an opposite end to the shell and biased yieldably to urge the armrest to assume the lowered armrest position.

16. The seat assembly of claim 6, further comprising a lock housing formed to include an interior region containing the armrest lock therein and an anti-rotation lug coupled to the lock housing and arranged to move in an axially extending slot formed in the barrel to block rotation of the lock housing about the pivot axis without blocking sliding movement of the barrel along the pivot axis as the armrest lock moves between the armrest-locking position and the armrest-releasing position.

17. The seat assembly of claim 16, further comprising a drive spring engaged at one end to the lock housing and at an opposite end to the barrel and biased yieldably to urge the armrest lock toward the armrest-locking position.

18. The seat assembly of claim 17, further comprising a lock actuator coupled to the barrel and mounted for movement on the lock housing to move the barrel against a biasing force generated by the drive spring so as to move the armrest lock to assume the armrest-releasing position when the armrest occupies one of the raised storage position and the lowered armrest position.

19. The seat assembly of claim 17, further comprising a return spring located in the interior region of the lock housing to engage the armrest and the lock housing and biased yieldably to urge the armrest to assume the lowered armrest position.

20. A seat assembly comprising
a seat,
an armrest mounted for movement relative to the seat about a pivot axis between a raised storage position and a lowered armrest position,
an armrest lock mounted for movement in a passageway formed in the seat between an armrest-locking position to engage the armrest and the seat and block movement of the armrest relative to the seat upon movement of the armrest about the pivot axis to one of the raised storage position and lowered armrest position and an armrest-releasing position to disengage the armrest to allow movement of the armrest relative to the seat about the pivot axis,
further comprising lock mover means for yieldably urging the armrest lock to assume the armrest-locking position upon movement of the armrest about the pivot axis to one of the raised storage position and lowered armrest position, and
wherein the lock mover means includes a hub configured to support the armrest lock as the armrest lock moves back and forth along the pivot axis between the armrest-locking position and the armrest-releasing position and a drive spring engaged at one end to the hub and at an opposite end to the armrest lock and biased yieldably to urge the armrest lock toward the armrest-locking position.

21. A seat assembly comprising
a seat
an armrest mounted for movement relative to the seat about a pivot axis between a raised storage position and a lowered armrest position,
an armrest lock mounted for movement in a passageway formed in the seat between an armrest-locking position to engage the armrest and the seat and block movement of the armrest relative to the seat upon movement of the armrest about the pivot axis to one of the raised storage position and lowered armrest position and an armrest-releasing position to disengage the armrest to allow movement of the armrest relative to the seat about the pivot axis, and
further comprising a lock housing formed to include an interior region containing the armrest lock therein and an anti-rotation lug coupled to the lock housing and arranged to move in a slot formed in the armrest lock to block rotation of the lock housing about the pivot axis without blocking movement of the armrest lock along the pivot axis as the armrest lock moves between the armrest-locking position and the armrest-releasing position.

22. The seat assembly of claim 21, further comprising a drive spring engaged at one end to the lock housing and at an opposite end to the armrest lock and biased yieldably to urge the armrest lock toward the armrest-locking position.

23. The seat assembly of claim 22, further comprising a lock actuator coupled to the armrest lock and mounted for movement on the lock housing to move the armrest lock against a biasing force generated by the drive spring so as to move the armrest lock to assume the armrest-releasing position when the armrest occupies one of the raised storage position and the lowered armrest position.

24. The seat assembly of claim 22, further comprising a return spring located in the interior region of the lock housing to engage the armrest and the lock housing and biased yieldably to urge the armrest to assume the lowered armrest position.

25. A seat assembly comprising
a seat including a seat back and a support mount coupled to the seat back and formed to include a barrel channel and a lug slot having an opening into the barrel channel,
an armrest lock including a barrel located to move in the barrel channel and inner and outer lugs coupled to the barrel for movement therewith and located to move in the lug slot, and
an armrest including an arm and an arm support coupled to the arm, the arm support being mounted on the armrest lock for movement relative to the seat and rotation on the armrest lock about a pivot axis to move the arm between a raised storage position and a lowered armrest position, the arm support including an inner arm support plate and an outer arm support plate positioned to lie in spaced-apart relation to the inner arm support plate to locate the support mount in a space provided therebetween,
wherein each of the inner and outer arm support plates is formed to include a barrel receiver, a first lug receiver having an opening into the barrel receiver and arranged to lie in side-by-side relation to the lug slot formed in the support mount upon movement of the arm to the raised storage position, and a second lug receiver having an opening into the barrel receiver and arranged to lie in side-by-side relation to the lug slot formed in the support mount upon movement of the arm to the lowered armrest position,
wherein the inner lug is located on the barrel to extend into both of the lug slot formed in the support mount and the first lug receiver formed in the inner arm support plate and the outer lug is located on the barrel to extend into both of the lug slot formed in the support mount and the first lug receiver formed in the outer arm support plate cooperatively to block movement of the arm relative to the seat upon movement of the arm about the pivot axis to the raised storage position and movement of the barrel in the barrel channel formed in the support mount to an armrest-locking position,
wherein the inner lug is located on the barrel to extend into both of the lug slot and the second lug receiver formed in the inner arm support plate and the outer lug is located on the barrel to extend into both of the lug slot formed in the support mount and the second lug receiver formed in the outer arm support plate cooperatively to block movement of the arm relative to the seat upon movement of the arm about the pivot axis to the lowered armrest position and movement of the barrel in the barrel channel formed in the support mount to the armrest-locking position, and
wherein each of the inner and outer lugs is located on the barrel to lie outside of the first and second lug receivers formed in the inner and outer arm support plates to allow rotation of the arm support on the armrest lock about the pivot axis and movement of the arm between the raised storage position and the lowered armrest position upon movement of the barrel in the barrel channel formed in the support mount to an armrest-releasing position.

26. The seat assembly of claim 25, wherein the inner lug is arranged to lie outside of the lug slot formed in the support mount and the outer lug is arranged to lie inside the lug slot formed in the support mount upon movement of the barrel to the armrest-releasing position.

27. The seat assembly of claim 25, wherein the barrel includes an inner bearing arranged to support an interior journal formed in the inner arm support plate and arranged to form an outer boundary of the barrel receiver formed in the inner arm support plate as the arm support rotates on the armrest lock about the pivot axis and the arm moves between the raised storage position and the lowered armrest position upon movement of the barrel to the armrest-releasing position.

28. The seat assembly of claim 27, wherein a portion of the inner bearing is positioned to lie in a space between the inner and outer lugs.

29. The seat assembly of claim 27, wherein the interior journal formed in the inner arm support plate includes four curved surfaces separated from one another and arranged to share a center of curvature positioned to lie along the pivot axis, the first receiver formed in the inner arm support plate is positioned to lie between a first adjacent pair of the four curved surfaces, and the second receiver formed in the inner arm support plate is positioned to lie between a second adjacent pair of the four curved surfaces.

30. The seat assembly of claim 27, wherein the barrel includes an outer bearing arranged to support an interior journal formed in the outer arm support plate and arranged to form an outer boundary of the barrel receiver formed in the outer arm support plate as the arm support rotates on the armrest lock about the pivot axis and the arm moves between the raised storage position and the lowered armrest position upon movement of the barrel to the armrest-releasing position.

31. The seat assembly of claim 30, wherein the outer lug is positioned to lie between the inner and outer bearings included in the barrel.

32. The seat assembly of claim 30, further comprising a drive spring located in the interior region of the lock housing to engage the barrel at one end and the lock housing at another end and biased to yieldably urge the barrel to the armrest-locking position and the button to an unactuated position.

33. The seat assembly of claim 25, further comprising a lock housing being formed to include an interior region containing the support mount, the inner and outer arm support plates, and the armrest lock, and a lock actuator coupled to the armrest lock and mounted on the lock housing to move the armrest lock in the interior region of the lock housing to the armrest-releasing position.

34. The seat assembly of claim 33, wherein the lock actuator includes a button located outside the lock housing and an actuator finger coupled to the button and arranged to extend through an aperture formed in the lock housing into an aperture formed in the barrel.

35. The seat assembly of claim 25, further comprising an anti-rotation lug coupled to the lock housing and arranged to move in a slot formed in the barrel to block rotation of the lock housing about the pivot axis as the barrel moves between the armrest-locking position and the armrest-releasing position and a return spring coupled at one end to the inner arm support plate and at an opposite end to the lock housing and biased yieldably to rotate the inner arm support plate about the pivot axis and move the arm to assume the lowered armrest position.

36. A seat assembly comprising
 a seat including a seat back portion, a side wall arranged to lie alongside the seat back portion and formed to include an armrest-receiving notch, and a support mount positioned to lie below the armrest-receiving notch,
 an armrest lock, and
 an armrest including an arm sized to fit into the armrest-receiving notch and an arm support coupled to the arm, the arm support being rotatable coupled to the armrest lock for rotation about a pivot axis to move the arm between a raised storage position lying in the armrest-receiving notch formed in the side wall and a lowered armrest position out of the notch formed in the side wall and wherein the armrest lock is mounted for movement in a passageway formed in the support mount between an armrest-locking position blocking movement of the arm support relative to the support mount upon movement of the arm about the pivot axis to one of the raised storage position and the lowered armrest position and an armrest-releasing position allowing movement of the arm support relative to the support mount.

37. The seat assembly of claim 36, wherein the side wall of the seat includes an inner panel located adjacent to the seat back portion, an outer panel located in spaced-apart relation to the inner panel to position the inner panel between the seat back portion and the outer panel, and a front panel interposed between the inner and outer panels, the front panel includes an upper portion located above the notch and a lower portion configured to define the notch and arranged to lie adjacent to the arm upon movement of the armrest to the raised storage position.

38. The seat assembly of claim 37, wherein the arm includes a top panel adapted to support an arm of an occupant seated in the seat upon movement of the armrest to the lowered armrest position, a bottom panel positioned to lie in spaced-apart relation to the top panel, an inner panel interposed between the front and rear panel, and an outer panel interposed between the front and rear panel and positioned to lie in spaced-apart relation to the inner panel, and wherein the arm is arranged to fill the notch upon movement of the armrest to the raised storage position to cause the top panel of the arm to face toward the lower portion of the front panel of the side wall of the seat and the bottom panel of the arm to merge with the upper portion of the front panel so that the bottom panel of the arm appears to an observer to be a continuation of the upper portion of the front panel.

39. The seat assembly of claim 37, the lower portion of the front panel of the side wall of the seat has a concave curved shape and the arm includes a top panel adapted to support an arm of an occupant seated in the seat upon movement of the armrest to the lowered armrest position and configured to have a convex curved shape made to mate with the concave curved shape of the lower portion upon movement of the armrest to the raised storage position.

40. The seat assembly of claim 36, further comprising lock mover means for yieldably urging the armrest lock to assume the armrest-locking position upon movement of the arm about the pivot axis to one of the raised storage position and the lowered armrest position.

41. The seat assembly of claim 36, further comprising means for yieldably rotating the armrest about the pivot axis to urge the arm into the lowered armrest position and out of the notch.

42. A seat assembly comprising
 a seat,
 an armrest lock mounted for movement on the seat, and
 an armrest mounted for relative rotation and engagement on the armrest lock about a pivot axis between a raised storage position and a lowered use position, wherein the armrest lock is constrained to move along the pivot axis between an armrest-locking position blocking rotation of the armrest about the pivot axis relative to the seat and an armrest-releasing position allowing rotation of the armrest about the pivot axis relative to the seat.

* * * * *